United States Patent
Ipsen et al.

(10) Patent No.: US 12,551,146 B2
(45) Date of Patent: Feb. 17, 2026

(54) BIOSENSOR AND RELATED WOUND DRESSING SYSTEM

(71) Applicant: Mölnlycke Health Care AB, Gothenburg (SE)

(72) Inventors: Paul Ipsen, Hässleholm (SE); Magnus Tägil, Lund (SE); David Wensbo Posaric, Lund (SE)

(73) Assignee: Mölnlycke Health Care AB, Gothenburg (SE)

( * ) Notice: Subject to any disclaimer, the term of this patent is extended or adjusted under 35 U.S.C. 154(b) by 399 days.

(21) Appl. No.: 16/759,771

(22) PCT Filed: Nov. 1, 2018

(86) PCT No.: PCT/SE2018/051117
§ 371 (c)(1),
(2) Date: Apr. 28, 2020

(87) PCT Pub. No.: WO2019/093944
PCT Pub. Date: May 16, 2019

(65) Prior Publication Data
US 2020/0323469 A1    Oct. 15, 2020

(30) Foreign Application Priority Data
Nov. 8, 2017    (SE) .................................. 1730308-2

(51) Int. Cl.
*A61B 5/00*    (2006.01)
*A61B 5/01*    (2006.01)
(Continued)

(52) U.S. Cl.
CPC .............. *A61B 5/1486* (2013.01); *A61B 5/01* (2013.01); *A61B 5/14507* (2013.01);
(Continued)

(58) Field of Classification Search
CPC ... A61B 5/01; A61B 5/14507; A61B 5/14532; A61B 5/14546; A61B 5/1468–1477;
(Continued)

(56) References Cited

U.S. PATENT DOCUMENTS 5,762,770 A * 6/1998 Pritchard ................. C12Q 1/00
435/14
10,716,490 B2    7/2020 Connolly
(Continued)

FOREIGN PATENT DOCUMENTS

JP    2005-530541 A    10/2005
JP    2012-532642 A    12/2012
(Continued)

OTHER PUBLICATIONS

Lizeng Gao, Njideka Mbonu, Liangliang Cao, and Di Gao; "Label-Free Colorimetric Detection of Gelatinases on Nanoporous Silicon Photonic Films" Anal. Chem. 2008, 80, 1468-1473 (Year: 2008).*
(Continued)

*Primary Examiner* — Tse W Chen
*Assistant Examiner* — Alice Ling Zou
(74) *Attorney, Agent, or Firm* — Ballard Spahr LLP

(57) ABSTRACT

A biosensor for detecting a biomarker in a bodily fluid, secretion or exudation is described that includes a first electrode, a second electrode, an electrode coating and a mechanical electrode stabilizer. The biomarker is an enzyme catalyzing a chemical reaction in which a singularity or plurality of constituents of the electrode coating are chemically altered by the breaking of covalent chemical bonds when being in contact with the same. The electrode coating can be a natural or synthetic substrate of the biomarker. The first electrode and the second electrode are electrically conductive and are kept in a substantially constant and uniform distance from each other by means of the mechani-
(Continued)

cal electrode stabilizer. The exposed electrically conductive surface of at least one of the first electrode and the second electrode are substantially fully covered by the electrode coating.

10 Claims, 4 Drawing Sheets

(51) Int. Cl.
| | | |
|---|---|---|
| A61B 5/145 | (2006.01) | |
| A61B 5/1477 | (2006.01) | |
| A61B 5/1486 | (2006.01) | |
| A61F 13/00 | (2024.01) | |
| C12Q 1/00 | (2006.01) | |

(52) U.S. Cl.
CPC ........ *A61B 5/14546* (2013.01); *A61B 5/1477* (2013.01); *A61B 5/445* (2013.01); *A61B 5/683* (2013.01); *A61B 5/746* (2013.01); *A61F 13/00051* (2013.01); *C12Q 1/005* (2013.01); A61F 2013/00953 (2013.01); G01N 2333/8146 (2013.01); G01N 2333/92 (2013.01); G01N 2333/96494 (2013.01)

(58) Field of Classification Search
CPC ...... A61B 5/1486–14865; A61B 5/445; A61B 5/6801–6802; A61B 5/053; A61B 5/0537; A61B 2562/164–166; A61B 5/1473–1477; A61B 5/6832–6833; A61F 2013/00927; A61F 2013/0094; A61F 2013/00953; A61F 2013/00965; A61F 13/00051–00055; A61F 15/00; G01N 27/3271–3272; G01N 33/56938–56944; G01N 33/573–5735; G01N 33/68–6803; G01N 2333/78; G01N 2333/8146; G01N 2333/92; G01N 2333/95; G01N 2333/952; G01N 2333/96494; G01N 27/02–021; G01N 27/026; G01N 27/327–3272; G01N 27/3275; G01N 27/3277; G01N 33/5438; G01N 33/6893; G01N 2333/96486; G01N 2800/26; G01N 2470/10–12; G01N 27/414; G01N 27/4145; G01N 27/4148; G01N 33/50; G01N 2333/8107; G01N 2333/91; C12Q 1/001–005; C12Q 1/008; C12Q 1/37; C12Q 2304/80; C12Q 2521/537
See application file for complete search history.

(56) References Cited

U.S. PATENT DOCUMENTS

| | | | | |
|---|---|---|---|---|
| 2005/0187580 A1* | 8/2005 | Skiba | ...................... | A61N 1/303 607/2 |
| 2006/0015019 A1 | 1/2006 | Watt et al. | | |
| 2007/0032717 A1* | 2/2007 | Brister | ............... | A61B 5/14865 600/347 |
| 2007/0231380 A1 | 10/2007 | Shah et al. | | |
| 2007/0231832 A1* | 10/2007 | Abbott | ............. | G01N 33/54373 435/7.1 |
| 2008/0171957 A1* | 7/2008 | Connolly | ................ | A61L 15/56 602/42 |
| 2008/0262323 A1* | 10/2008 | Gerber | ............... | A61B 5/14546 600/301 |
| 2010/0003710 A1* | 1/2010 | Bertin | ....................... | C12Q 1/37 435/24 |
| 2011/0257504 A1* | 10/2011 | Hendricks | ................ | A61N 1/05 607/45 |
| 2012/0190956 A1 | 7/2012 | Connolly | | |
| 2012/0252046 A1* | 10/2012 | Fei | ......................... | A61B 5/145 435/14 |
| 2013/0183243 A1* | 7/2013 | LaBelle | ............. | G01N 33/6869 424/9.1 |
| 2013/0271278 A1 | 10/2013 | Duesterhoft | | |
| 2014/0058344 A1 | 2/2014 | Toth | | |
| 2015/0011421 A1* | 1/2015 | Li | ............................ | C12Q 1/37 506/18 |
| 2015/0259724 A1* | 9/2015 | Guan | ...................... | C12Q 1/37 435/24 |
| 2016/0109401 A1* | 4/2016 | Wardell | ................. | C12Q 1/005 205/777.5 |
| 2018/0020964 A1* | 1/2018 | Newberry | ............. | G16H 50/30 600/301 |
| 2018/0267012 A1* | 9/2018 | Scherer | ............. | A61F 13/00051 |

FOREIGN PATENT DOCUMENTS

| | | | | |
|---|---|---|---|---|
| WO | WO-0075360 A2 | 12/2000 | | |
| WO | WO-2005/121357 A2 | 12/2005 | | |
| WO | WO-2008/047095 A1 | 4/2008 | | |
| WO | WO 2012/013937 A1 | 2/2012 | | |
| WO | WO-2012074509 A1 * | 6/2012 | ......... | A61B 10/0045 |
| WO | WO 2017064311 | 4/2017 | | |

OTHER PUBLICATIONS

Biela, A. et al "Disposable MMP-9 sensor based on the degradation of peptide cross-linked hydrogel films using electrochemical impedance spectroscopy", Biosensors and Bioelectronics, vol. 68, Jun. 1, 2015, pp. 660-667.

Gao, L.Z., et al., 2008. "Label-Free Colorimetric Detection of Gelatinases on Nanoporous Silicon Photonic Films", Analytical Chemistry 80 (5), 1468-1473 (Abstract).

Mirsky V. M. et al, "Capacitive sensor for lipolytic enzymes", Thin Solid Films, 1996, 284-285, p. 939-941.

Nakagami, G., et al., 2010. "Predicting delayed pressure ulcer healing using thermography: a prospective cohort study", Journal of Wound Care 19 (11), 465-472 (Abstract).

Zhou, J., et al., 2010. "A Thin Film Detection/Response System for Pathogenic Bacteria", Journal of the American Chemical Society 132 (18), 6566-6570 (Abstract).

International Search Report and Written Opinion were mailed on Jan. 17, 2019 by the International Searching Authority for International Application No. PCT/SE2018/051117, filed on Nov. 1, 2018 and published as WO 2019/093944 on May 16, 2019 (Applicant—Innovation Skane) (9 Pages).

* cited by examiner

BIOSENSOR AND RELATED WOUND DRESSING SYSTEM

CROSS-REFERENCE TO RELATED APPLICATIONS

This application is a U.S. National Phase Application of International Application No. PCT/SE2018/051117, filed Nov. 1, 2018, which claims priority to Swedish Application No. 1730308-2, filed Nov. 8, 2017, each of which are hereby incorporated by reference in their entirety.

TECHNICAL FIELD

The present invention relates to biosensors for detecting biomarkers in a bodily fluid, secretion or exudation for monitoring or diagnostic purposed directed to wounds.

BACKGROUND

The disease burden of failing skin repair and non-healing ulcers on the healthcare system is extensive. In the USA, non-healing ulcers and chronic wounds are reported to affect 6.5 million patients at an annual national cost of $30 billion. These figures are projected to grow with ageing of the population and the rising prevalence of diseases that contribute to the development of non-healing ulcers, such as obesity and diabetes. Furthermore, complications also affect burn wounds, where local infections cause delayed healing and risk for invasive infections and sepsis. For example, in Sweden, about one third of the hospital antibiotic consumption is related to postoperative prophylaxis. Compromised healing is also seen in relation to use of biomaterials, such as synthetic grafts and prosthesis, which may induce inflammatory reactions and increase infection risk further.

Presently, wounds and wound healing is most commonly managed by traditional dressings and bandages. Typically, the patient is scheduled to visit the hospital periodically to have a doctor or nurse to inspect the healing wound, in which process the dressing or bandage is often removed and replaced with a new one. Wound healing complications may occur at a time which is relatively long before the next visit, whereby it may not be attended to immediately as often warranted in case of complications. In addition, the opening of the dressing or bandage in a hospital environment constitute a serious risk per se. Hospital related microorganisms, that may cause complicated secondary infections, may thus be introduced even in the case when it could be concluded that the wound was healing as expected and the dressing would not have had to be removed or replaced at all.

The high complexity of the wound healing process means there are many possible methods, markers, and biological and physical principles that potentially could be utilized to assess the status of a wound. In particular, it is desirable to be able to detect an infection, preferably at an early stage. Hence, much effort has been devoted to the identification of such methods, markers, and biological and physical principles related to infection.

Bacterial toxins, such as e.g. phospholipase A2 and hemolysin from *S. aureus* and *P. aeruginosa*, may cause release of a detectable dye from substrate targets in the form of lipid vessels (Zhou, J., Loftus, A. L., Mulley, G., Jenkins, A. T. A., 2010. Journal of the American Chemical Society 132 (18), 6566-6570). Disadvantages of this method include, for example, the subjective or elaborate quantification of the readout, which involves either subjective visual inspection or need for a separate analysis requiring e.g. instrumentation for fluorescence spectroscopy. Furthermore, the outer covering of a wound dressing may hinder the visual inspection of underlying released dye. In such a case, at least the outer covering part of the wound dressing would have to be removed, whereby the risk of infection increases.

Matrix metalloproteinases are zinc-dependent endopeptidases with increased activity in chronic wound fluid, which may be detected by employment of substrate coated porous silicon in a chip format (Gao, L. Z., Mbonu, N., Cao, L. L., Gao, D., 2008. Analytical Chemistry 80 (5), 1468-1473). Disadvantages of this method include, for example, the need to dry or by other means treat the chip in order to get a visual read-out after exposure to the object of analysis. Hence, this method is not well suited for a real-time analysis desired in e.g. a wound dressing.

Temperature is an established marker of infection in wounds and may be used as an early predictor of chronicity before any obvious changes to the appearance of the wound are observed (Nakagami, G., Sanada, H., Iizaka, S., Kadono, T., Higashino, T., Koyanagi, H., Haga, N., 2010. Journal of Wound Care 19 (11), 465-472). Disadvantages of using only temperature of a predictor of infection include, for example, the high risk of false positives due to the fact that several benign processes, which are normal to healing wound, may cause a temporal increase in temperature.

In view of above mentioned problems and disadvantages of the current prior-art, there is a need for improved biosensors for the monitoring of the healing process of wounds. In particular, there is a need for such sensors that may be incorporated in a wound dressing and with an ability to output an alarm signal, should the wound be in need of acute medical attention, such as e.g. in the case of an infection.

SUMMARY

Accordingly, examples and embodiments of the present invention preferably seek to mitigate, alleviate or eliminate one or more deficiencies, disadvantages or issues in the art, such as the above-identified, singly or in any combination by providing a biosensor according to the appended patent claims.

According to a first aspect, a biosensor for detecting a biomarker in a bodily fluid, secretion or exudation comprising a first electrode, a second electrode, an electrode coating and a mechanical electrode stabilizer, is provided. The biomarker being an enzyme catalyzing a chemical reaction in which a singularity or plurality of constituents of the electrode coating are chemically altered by the breaking of covalent chemical bonds when being in contact with the same. The electrode coating comprises a natural or synthetic substrate of the biomarker. The first electrode and the second electrode are electrically conductive and are kept in a substantially constant and uniform distance from each other by means of the mechanical electrode stabilizer. The exposed electrically conductive surface of at least one of the first electrode and the second electrode are substantially fully covered by the electrode coating. The biosensor exists in at least one state of the group of states comprising a high impedance state, in which the electrode coating is substantially chemically unaltered by the biomarker, and a low impedance state, in which the electrode coating is chemically altered by the biomarker.

According to a second aspect, a biosensor is provided comprising a biosensor according to the first aspect, wherein the mechanical electrode stabilizer is an integral part of or is intimately integrated with a wound dressing adapted to protect a wound.

According to a third aspect, a diagnostic wound dressing system comprising a biosensor of the first or second aspect, a wound dressing adapted to protect a wound, an impedance reader unit and a processor unit, is provided. The impedance reader unit is electrically connected to and adapted to continuously or periodically measure the impedance or resistance between the first electrode and the second electrode. The processor unit is connected to the impedance reader unit and adapted to compare impedance or resistance data thereof with a singularity or plurality of pre-set limit values to output an alarm signal if said pre-set limit values are met or exceeded.

Further examples of the invention are defined in the dependent claims, wherein features for the second and third aspect of the disclosure is as for the first aspect mutatis mutandis.

Some examples of the disclosure provide for a biosensor being sensitive for an enzyme selected from the group of enzymes consisting of Gelatinase and PhosphoLipase A2 (PLA2).

Some examples of the disclosure provide for a diagnostic wound dressing comprising an additional temperature sensor adapted to measure the temperature of the wound or its immediate surrounding. The temperature sensor is connected to the processor unit for providing further input thereto, in parallel and in addition to the biomarker related signal, as basis for output of the alarm signal.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION

Figure 1:
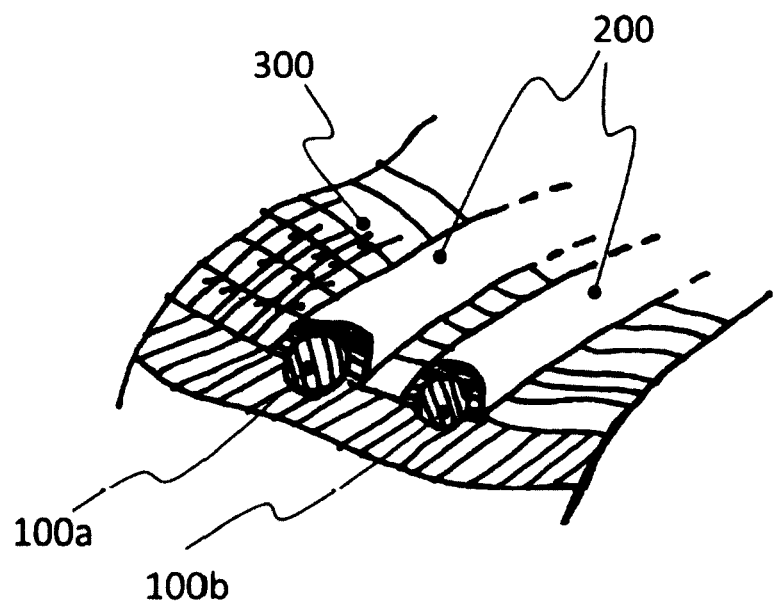
FIG. 1 is a cut-through view of a biosensor of the invention, showing a first electrode 100a and a second electrode 100b, each covered with an electrode coating 200 on the upper outer surface and each having the lower outer surface immobilized in a mechanical electrode stabilizer 300 via a non-conductive interface, according to an embodiment of the disclosure.
Figure 2:
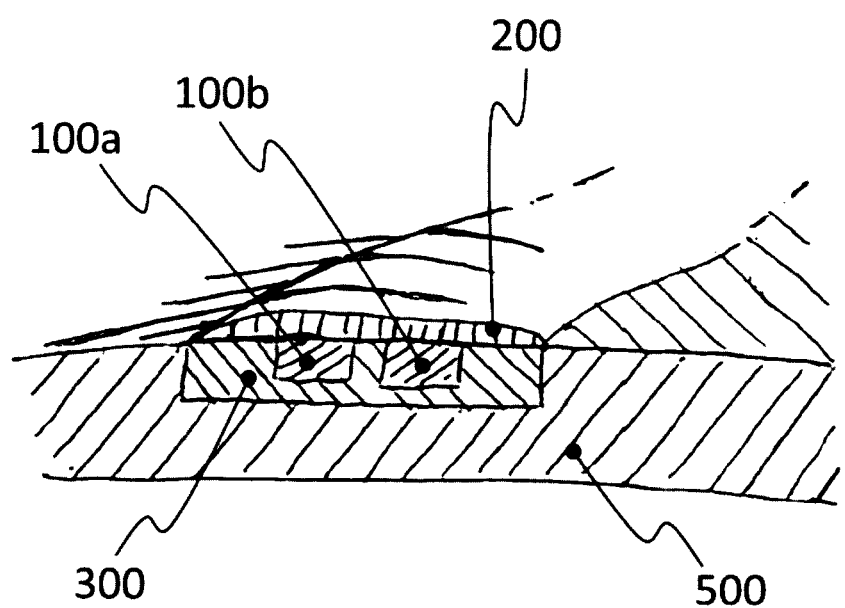
FIG. 2 is a cut-through view of a biosensor of the invention, showing a rectangular or sheet-shaped first electrode 100a and a rectangular or sheet-shaped second electrode 100b, being immobilized in a mechanical electrode stabilizer 300, in turn integrated with a wound dressing 500, such that the upper outer surfaces of the electrodes 100a, 100b are exposed and covered by electrode coating 200, according to an embodiment of the disclosure.
Figure 3:
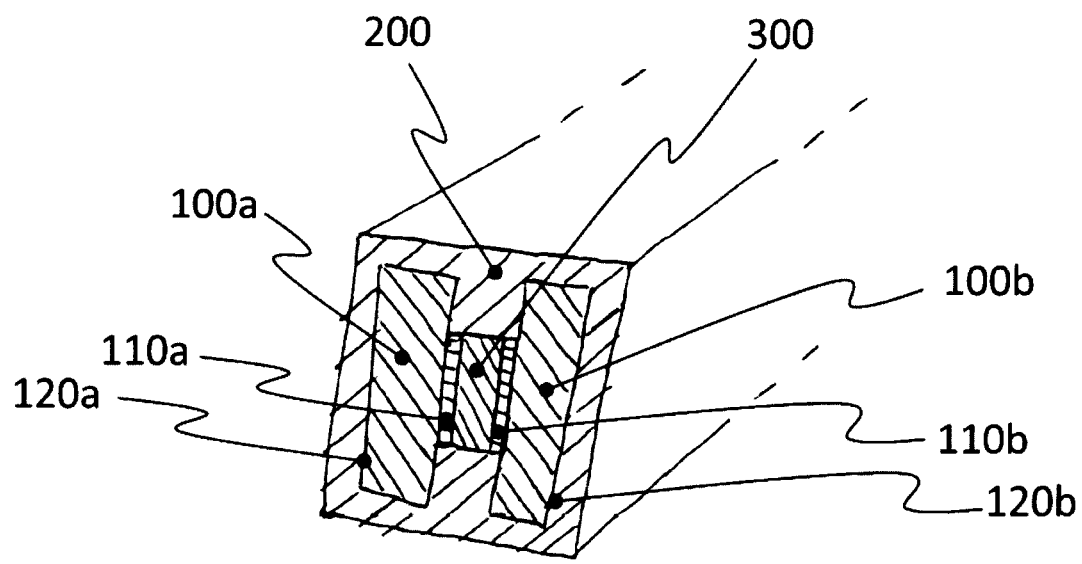
FIG. 3 is a cut-through view of a biosensor of the invention, showing rectangular shaped first and second electrodes 100a, 100b separated at a distance from each other by a mechanical electrode stabilizer 300, which is adhered to the electrodes via a first insulating partial surface 110a and a second insulating partial surface 110b, the first electrically conductive partial surface 120a and the second electrically conductive partial surface 120b of the electrodes are fully covered by electrode coating 200, according to an embodiment of the invention.
Figure 4:
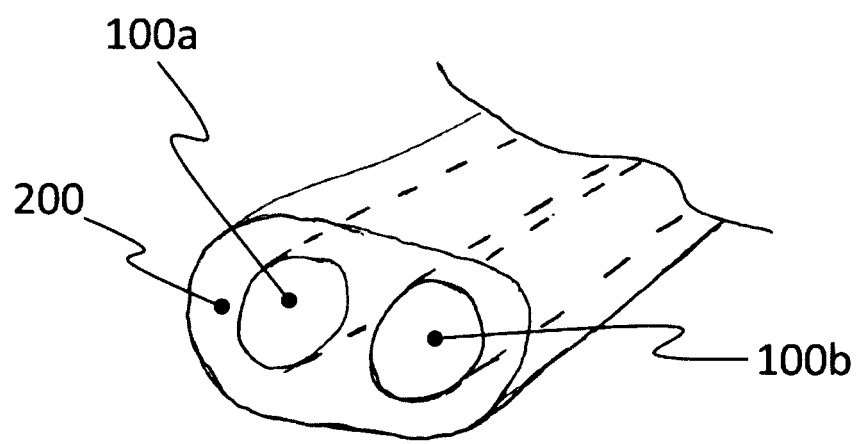
FIG. 4 is a cut-through view of a biosensor of the invention, showing circular shaped first and second electrodes 100a, 100b separated at a distance from each other by being fully integrated in electrode coating 200, which electrode coating 200 is simultaneously serving as a mechanical electrode stabilizer 300 and comprising constituents that may be chemically altered by biomarkers resulting in a lowering of the impedance between the electrodes, according to an embodiment of the invention.
Figure 5:
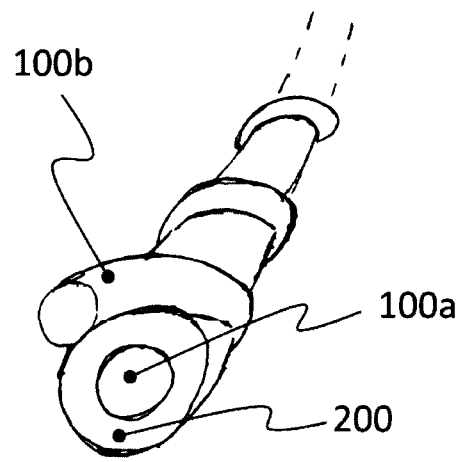
FIG. 5 is a cut-through view of a biosensor of the invention, showing circular shaped first and second electrodes 100a, 100b, in which the outer surface of the first electrode 100a is fully covered by a layer of electrode coating 200 and the second electrode 100b is winded around the outer surface of the electrode coating 200 such that the electrodes are separated from each other at a substantially constant distance along their extension, according to an embodiment of the invention.
Figure 6:
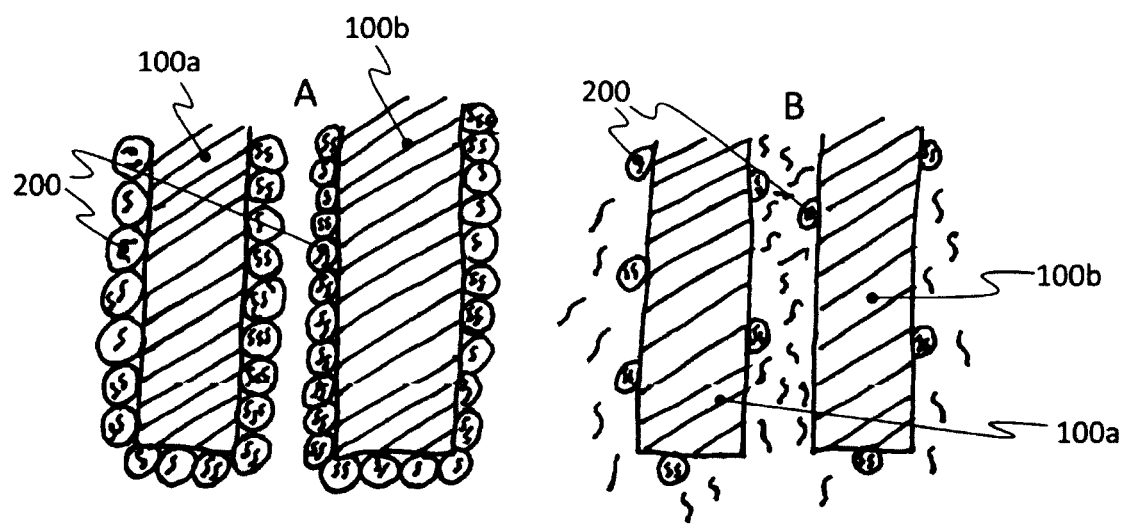
FIG. 6A is a schematic view of a biosensor of the invention in a high impedance state, showing a first and a second electrode 100a, 100b, each covered with electrode coating 200 consisting of a plurality of microscopic vesicles, comprising substrate in their exposed outer surface and comprising electrical booster (illustrated as S-shaped objects) in their inner volumes.
FIG. 6B is a view of the biosensor of FIG. 5A in a low impedance state, in which the substrate has been chemically altered by a biomarker resulting in bursting of the majority of the microscopic vesicles and accompanying release of the electrical booster in the local environment of the electrodes.
Figure 7:
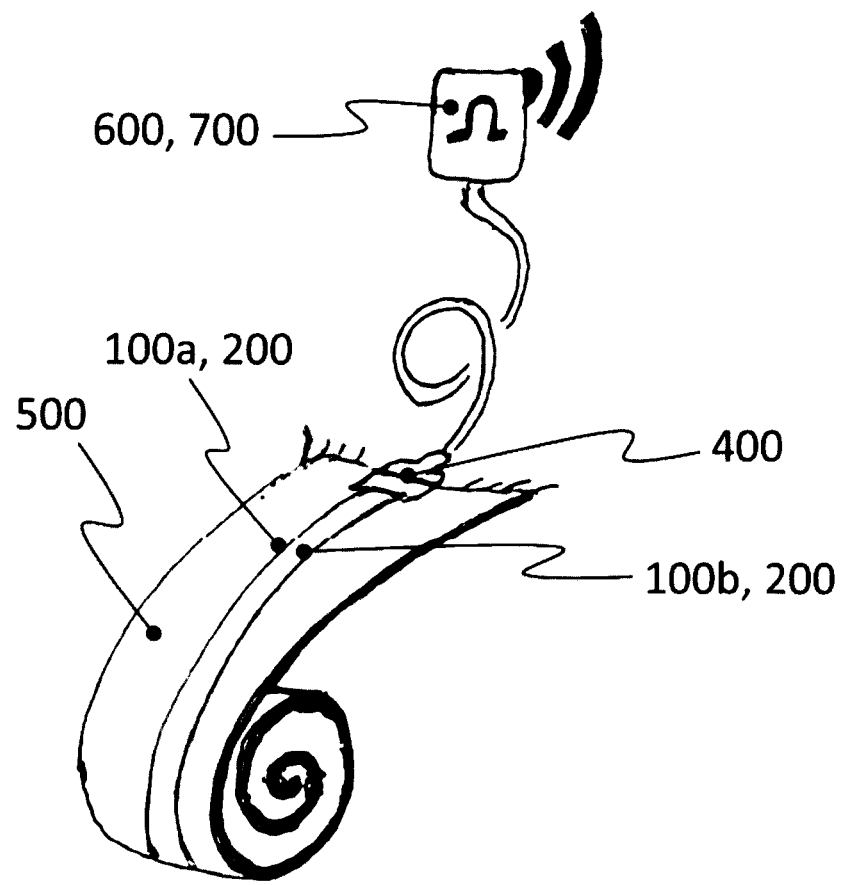
FIG. 7 is a schematic view of a diagnostic wound dressing system of the invention, showing a wound dressing 500 in which a first electrode 100a, covered in electrode coating 200, and a second electrode 100b, covered in electrode coating 200, are integrated therein and extending along the extension of the wound dressing 500 at a uniform distance from each other, and a combined impedance reader unit 600 and processor unit 700 adapted to transmit and receive data via WiFi and electrically connected to the electrodes 100a, 100b via an electrical connector 400, according to an embodiment of the invention.

Specific examples of the invention will now be described with reference to the accompanying drawings. This invention may, however, be embodied in many different forms and should not be construed as limited to the examples set forth herein; rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements.

The biosensor of the invention essentially comprises two electrodes, a first electrode 100a and a second electrode 100b. The electrodes are electrical conductors due to the presence, partly or fully, of electrically conductive materials. Examples of conductive materials suitable for constructions of the electrodes include, but is not limited to, metals, elemental carbon and electrically conducting organic polymers. The electrodes, i.e. the active measuring surface-conductive part thereof, are suitably kept at a uniform distance from each other for the impedance between these to be substantially dependent on the nature of the immediate environment. In order to keep the electrodes at an essentially uniform distance from each other, a mechanical electrode stabilizer 300 may be employed. For example, the mechanical electrode stabilizer 300 may be sheet formed, or having any other suitable form as known in the art, having the electrodes immobilized on its surface. Examples of suitable materials of the electrode stabilizer 300 include, but is not limited to, cellulose, chemically modified cellulose, an organic polymer, glass fiber, silicon, a thermoplastic or mixtures thereof. Preferably, the interface between electrode and electrode stabilizer 300 may be electrically insulating such that the first electrode 100*a* is attached to the surface of the electrode stabilizer 300 via a first insulating partial surface 110*a* and the second electrode 100*b* is attached to the surface of the electrode stabilizer 300 via a second insulating partial surface 110*b*. The active measuring surface-conductive parts of the electrodes are essentially equal to the remaining surfaces of the electrodes, i.e. a first electrically conductive partial surface 120*a* of the first electrode 100*a* and a second electrically conductive partial surface 120*b* of the second electrode 100*b*.

The functionality of the present biosensor relies on an electrode coating 200 of the first and/or second electrically conductive partial surfaces 120*a*, 120*b* of the electrodes as a substantial contributor, in a state where it has not been chemically altered or affected by a biomarker, i.e. a high impedance state, to the impedance between the electrodes. In a state where the electrode coating 200 has been affected, such as partly or fully chemically degraded by influence of the biomarker, i.e. a low impedance state, its contribution to the impedance is less than in the case of the high impedance state. The low impedance state may comprise a plurality of states in which the electrode coating is chemically altered by the biomarker to different degrees. For example, the electrode coating may be chemically altered to a relatively small degree, whereby the difference in impedance between the electrodes is relatively small in comparison between this case and the case of the high impedance state. In another example, the electrode coating may be chemically altered to a relatively high degree, whereby the difference in impedance between the electrodes is relatively large in comparison between this case and the case of the high impedance state. Hence, the presence of a biomarker may be detected by periodically measuring the impedance between the first electrode 100*a* and the second electrode 100*b*, provided that the conductive active measuring surface of at least one of these, i.e. the first and/or second electrically conductive partial surfaces 120*a*, 120*b*, are covered with electrode coating 200. The biomarker may be qualitatively and optionally quantitatively determined by analysis of the impedance versus time relationship. Such an analysis may be automatically conducted by a processor unit 700, being suitably adapted for the receival of related electrical signals and provided with a suitable algorithm in the form of a program.

The biomarker may be an enzyme catalyzing a chemical reaction, in which a singularity or plurality of constituents of the electrode coating 200 are chemically altered by the breaking of covalent chemical bonds, when being in contact with the same. Hence, the electrode coating 200 may comprise a natural or synthetic substrate of the enzyme. Essentially, the electrode coating 200 comprise such a substrate in an amount enough and of such a nature that its degradation due to the effect of the enzyme cause a detectable microscopic or macroscopic change of the electrode coating 200, resulting in a change in the impedance between the electrodes. Suitable substrates for incorporation in the electrode coating 200 are substrates of biomarkers with enzymatic activity, which are related to undesired medical states of a wound, for example infection. Examples of such biomarkers include matrix metalloproteinases, such as collagenases and gelatinases. Additional examples of such biomarkers include phospholipase, such as phospholipase A1, phospholipase A2 and phospholipase C.

According to one embodiment, the substrate of the electrode coating 200 may be selected from the group of substrates consisting of collagen I, III, IV, V, VII and X, gelatin, fibronectin, laminin, aggrecan and elastin or mixtures or synthetic derivatives thereof.

According to one embodiment, the substrate of the electrode coating 200 may be chemically degraded by the influence of a gelatinase. Examples of such substrates include type IV collagen and gelatin.

According to one embodiment, the substrate of the electrode coating 200 may be chemically degraded by the influence of MMP-2.

According to one embodiment, the substrate of the electrode coating 200 may be gelatin.

According to one embodiment, the substrate of the electrode coating 200 may be chemically degraded by the influence of phospholipase A1 and/or phospholipase A2. Examples of such substrates include phospholipids with a glycerol backbone, such as phosphatidylcholines with endogenous fatty acid residues.

According to one embodiment, the substrate of the electrode coating 200 may be a phosphatidylcholine with synthetic non-endogenous fatty acid residues. Such synthetic non-endogenous fatty acid residues may designed to give a relative large effect of the impedance or resistance in solutions thereof, as compared to e.g. endogenous fatty acid residues. For example, the fatty acid residues may comprise charged substituents or redox-elements. Advantageous, the corresponding substrate, when hydrolyzed by the influence of e.g. phospholipase A1, phospholipase A2 and/or phospholipase C, may give a higher sensitivity of a biosensor according to the invention in comparison to a corresponding biosensor employing endogenous fatty acids.

According to one embodiment, the electrode coating 200 may essentially consist of substrate, such as gelatin.

The electrode coating 200 may comprise additional coating stabilizing agents and/or electrical boosters adapted to provide mechanical stabilizing properties and, in its released form, impedance decreasing or increasing effects, respectively. Examples of coating stabilizing agents are well known in the art and may be selected by the skilled person on basis of the employed substrate. For example, the coating stabilizing agent may be a polymeric non-conducting fiber, woven or entangled, onto which the electrode coating 200 is applied. Selection of a suitable electrical booster may be conducted by the skilled person on basis of the chosen substrate. Such electrical boosters are well known in the art. One example of such electrical boosters is conducting nano-fibers, which may decrease the impedance between the electrodes when mechanically released from an immobilized form in the electrode coating 200 upon biomarker induced chemical and related mechanical degradation. Another example is a solid or amorphous immobilized salt, which upon the same type of release dissolves in the immediate aqueous environment of the electrodes causes an increase in conductivity thereof, detectable as a decrease in impedance.

According to one embodiment, the electrode coating 200 may comprise or substantially consist of microscopic vesicles, with a structural integrity which is dependent on the presence of a substrate of a biomarker according to the invention. The synthesis and production of such vesicles are well known in the art. For example, suitable vesicles sensitive to phospholipases were described by Zhou et al (Zhou, J., Loftus, A. L., Mulley, G., Jenkins, A. T. A., 2010. Journal of the American Chemical Society 132 (18), 6566-6570). The inner volumes of such vesicles may preferably be charged with a singularity or plurality of suitable electrical boosters. A suitable electrical booster is a physical or molecular entity which cause a significant change of the impedance between the first electrode 100a and the second electrode 100b, when released from the inner volumes of the vesicles as an effect of degradation by the biomarker. Suitable include, for example, impedance increasing boosters, such as electrical conductors, e.g. carbon nano-fibers, or impedance decreasing boosters, such as electrical isolators forming an insulating non- or low-conductive film on the electrodes when released from the vesicles.

The biosensor of the invention is suitable for the detection of biomarkers in, for example, human bodily fluid, secretion or exudation. In particular, it is suitable for the qualitative or quantitative determination of relevant biomarkers of wound exudates or wound drainages. It may be integrated in a wound dressing 500 for continuous monitoring of such biomarkers. For example, the optionally suitably modified fabric or the tissue of the wound dressing 500 per se may constitute the mechanical electrode stabilizer 300. Advantageously and due to its basically electrical read out, it may in such applications provide a user with essential information on biomarkers of relevance for the healing or infection of wounds without need to open the dressing. Methods of the prior-art, such as methods with visual read out or methods that require collection of sample aliquots for analysis, typically require such opening of the dressing with an associated risk of e.g. introducing an infection.

A diagnostic wound dressing system of the invention essentially comprise the herein taught biosensor of the invention, suitably integrated in a wound dressing 500 adapted to protect a wound in accordance with normal wound treatment and management. The integrated biosensor may be connected to a suitable impedance reader 600, well known to the skilled person, and further adapted to continuously or periodically measure the impedance or resistance between the first electrode 100a and the second electrode 100b. A processor unit 700 may be connected to and get impedance or resistance data from the impedance reader unit 600. A processor unit 700 assisted comparison of such impedance or resistance data with stored pre-determined limit values may be used for automatic determination on if an alarm signal indicating a medical emergency should be output.

According to one embodiment, the impedance reader unit 600 and the processor unit 700 may be integrated in the same unit or casing, further adapted for serving as a wearable "plug-in" to the wound dressing 500 of the diagnostic wound dressing system. Such a unit or casing may be further provided with means for wireless transmission of e.g. the alarm signal, e.g. over WiFi or Bluetooth, to enable immediate signaling to medical personnel, e.g. over internet, or to e.g. the patients smartphone or tablet. Advantages of such a wearable "plug-in" include e.g. reusability of the same, with associated savings in reduced cost and environment as compared to the case of corresponding one-time-use items.

According to one embodiment, the diagnostic wound dressing system may further comprise an integrated temperature sensor 800. Such a sensor may be connected to the processor unit 700, for providing further input thereto, and adapted to measure the temperature of the wound or its immediate surrounding. Based on both of the impedance data input and the temperature data input, the processor unit 700 assisted comparison with stored pre-determined limit values may advantageously give a lower risk for false positive alarm signals, as compared to the case when only one of these input categories are taken into consideration.

EXAMPLES

Beside general and standard laboratory equipment and reagents, the following were used for the carrying out of below EXAMPLES 1 to 3 of the invention:

Interdigitated gold electrodes with 10 microns lines and gaps on glass substrate from Metrohm AG were used for impedance measurements and as a model of a first electrode 100a and a second electrode 100b immobilized on a mechanical electrode stabilizer 300 (Naked Biosensor Model, NBM);

5% aqueous solutions of bovine gelatin (5% BG) and porcine gelatin (5% PG) were prepared by an initial hydration of the corresponding dry gelatin powder (5.0 g) in water (100 ml) at 23° C. for 60 mins. Excess (apprx. 40 ml) water was thereafter carefully decanted off and the remaining hydrated gelatin was diluted with water to a total volume of 100 ml. While stirring, the suspension was heated at 50-52° C. until homogenous and used directly for the production of bovine covered NBS's, serving as models of biosensors of the invention in which the electrodes are covered with electrode coatings 200 comprising gelatin as substrate.

Stock solutions comprising 0.1% bovine serum albumin in Dulbecco's phosphate buffered saline (BSAPBS), serving as a model of a healthy wound exudate not requiring acute medical attention of the corresponding wound, were prepared by diluting a 7.5% bovine serum albumin in Dulbecco's phosphate buffered saline solution (6.67 ml) to 500 ml with Dulbecco's phosphate buffered saline.

Stock solutions of MMP-2 (10 microg., human recombinant *E. coli* expressed from Sigma # SRP3118) were prepared by dissolution in 0.1% BSA (1.0 ml) and stored at −16° C. before use.

Experimental solutions comprising MMP-2 (BSAPBS-MMP2), serving as a model of a wound exudate corresponding to a wound in need of acute medical attention, were prepared by diluting 0.1 ml of above described stock solution of MMP-2 with BSAPBS (4.9 ml).

Example 1—Preparation of Gelatin Coated Biosensor Models (BGBM and BGBM)

A glass thermometer, having a rounded off end with a spherical shape of a diameter of apprx. 5 mm, were dipped in hot (50-52° C.) 5% BG. When hold in a vertical position, the drop formed by gravity on its lower end were then immediately smeared on the electrode side of a vertically held NBM in such a way that its entire surface was totally covered. The covered NBM was then kept horizontally at −16° C. for 5 mins. to form a bovine gelatin coated NBM (BGBM), which were allowed to attain ambient temperature before use. A porcine gelatin coated NBM (PGBM) was prepared in an analogous way.

Example 2—Comparison of Electric Characteristics Between NBM and BGBM or PGBM and Stability of the Latter in BSAPBS NBM and gelatin covered NBM's (BGBM and PGBM) were connected to an impedance reader and dipped into gently stirred BSAPBS at 23° C., such that the entire electrode covered surface was within the BSAPBS and such that the upper surface of the gelatin film, in case of BGBM and PGBM, was above the BSAPBS. Scanning of the resistance between the electrodes at 1 Hz to 1 kHz revealed a substantially linear relationship between resistance and frequency, from 12 kohm (at 1 kHz) to 117 kohm (at 1 Hz) in the case of NBM and from 14 kohm (at 1 kHz) to 132 kohm (at 1 Hz) in the case of NBM and BGBM. This corresponds to a difference of 2 kohm (at 1 kHz) and 15 kohm (at 1 Hz) between NBM and BGBM or PGBM, the latter two consistently showing a relatively higher resistance. No change in this difference could be noted after 6 hours incubation. After removal of the gelatin film from the BGBM and PGBM by washing in hot water (about 45° C.) and subsequent new scanning of the resistance in the same way, the resistance-frequency relationship could not be differed from that of a NBM.

These experimental results support the differentiation, by measurement of electric characteristics, of a biosensor of the invention comprising a gelatin as substrate, from the corresponding biosensor in which this gelatin has been fully or partly removed. It has further been shown that the electric characteristics of such a biosensor is stable over a prolonged time.

Example 3—MMP-2 Induced Degradation of Gelatin

The experiment according to EXAMPLE 2 was repeated with the only exception that BSAPBS-MMP2 was used as medium instead of BSAPBS. In this case, it was revealed that the electrical characteristics of both of BGBM and PGBM could not be differentiated from those of the NBM after 2 h incubation. Hence, the presence of MMP-2 decreases the stability of the BGBM and the PGBM to be <2 h (compare EXAMPLE 3 where a stability of >6 h could be noted).

The experimental results from this example and EXAMPLE 2 taken together support the differentiation, by measurement of electric characteristics, of a biosensor of the invention comprising a gelatin as substrate from a first case, where the biomarker MMP-2 is absent from the local environment, from a second case, where the biomarker MMP-2 is present in the local environment.

The present invention has been described above with reference to specific examples. However, other examples than the above described are equally possible within the scope of the invention. The different features and steps of the invention may be combined in other combinations than those described. The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

ITEMIZED LIST OF EMBODIMENTS

1. A biosensor for detecting a biomarker in a bodily fluid, secretion or exudation, comprising a first electrode (100*a*), a second electrode (100*b*), an electrode coating (200) and a mechanical electrode stabilizer (300), wherein said biomarker being an enzyme catalyzing a chemical reaction in which a singularity or plurality of constituents of said electrode coating (200) are chemically altered by the breaking of covalent chemical bonds when being in contact with the same;

said electrode coating (200) comprising a natural or synthetic substrate of said biomarker;

said first electrode (100*a*) and said second electrode (100*b*) being electrically conductive and being kept in a substantially constant and uniform distance from each other by means of said mechanical electrode stabilizer (300);

the exposed electrically conductive surface of at least one of said first electrode (100*a*) and said second electrode (100*b*) being substantially fully covered by said electrode coating (200); and said biosensor existing in at least one state of the group of states comprising a high impedance state, in which said electrode coating (200) is substantially chemically unaltered by said biomarker, and a low impedance state, in which said electrode coating (200) is chemically altered by said biomarker.

2. A biosensor according to claim 1, wherein said mechanical electrode stabilizer (300) being adhered to a first insulating partial surface (110*a*) and a second insulating partial surface (110*b*) of the outer surface of said first electrode (100*a*) and said second electrode (100*b*), respectively;

a first electrically conductive partial surface (120*a*) and a second electrically conductive partial surface (120*b*) of the outer surface of said first electrode (100*a*) and said second electrode (100*b*), respectively, being electrically conductive surfaces devoid of said electrically insulating interface; and at least one of said electrically conductive partial surfaces (120*a*, 120*b*) of said first electrode (100*a*) and said second electrode (100*b*), respectively, being substantially fully covered by said electrode coating (200).

3. A biosensor according to any of the preceding claims, wherein said bodily fluid, secretion or exudation being a wound exudate or wound drainage produced by the body in response to tissue damage.

4. A biosensor according to claim 3, wherein said mechanical electrode stabilizer (300) being an integral part of or being intimately integrated with a wound dressing (500) adapted to protect said wound.

5. A biosensor according to any one of the preceding claims, wherein said enzyme being selected from the group of enzymes consisting of Gelatinase and PhosphoLipase A2 (PLA2).

6. A biosensor according to any one of the preceding claims, wherein said enzyme being Matrix MetalloProteinase-2 (MMP2) and said natural or synthetic substrate being selected from the group of substrates consisting of Collagen I, III, IV, V, VII and X, gelatin, fibronectin, laminin, aggrecan and elastin or mixtures or synthetic derivatives thereof.

7. A biosensor according to any one of claims 1 to 5, wherein said enzyme being PhosphoLipase A2 (PLA2) and said natural or synthetic substrate being a phospholipid with a glycerol backbone or mixtures or synthetic derivatives thereof.

8. A biosensor according to any one of the preceding claims, wherein the electrical conductivity of said first electrode (100*a*) or said second electrode (100*b*) can be derived, fully or partly, from the presence of an electrical conductor selected from the group of conductors consisting of metals, elemental carbon and electrically conducting organic polymers.

9. A biosensor according to any one of the preceding claims, wherein said mechanical electrode stabilizer (300) substantially consist of cellulose, chemically modified cellulose, an organic polymer, glass fiber, silicon, a thermoplastic or mixtures thereof.

10. A diagnostic wound dressing system, comprising a biosensor according to any one of the preceding claims, a wound dressing (500) adapted to protect a wound, an impedance reader unit (600) being electrically connected to and adapted to continuously or periodically measure the impedance or resistance between said first electrode (100*a*) and said second electrode (100*b*), and a processor unit (700) connected to said impedance reader unit (600) and adapted to compare impedance or resistance data thereof with a singularity or plurality of pre-set limit values to output an alarm signal if said pre-set limit values are met or exceeded.

11. A diagnostic wound dressing system according to claim 10, further comprising a temperature sensor (800) adapted to measure the temperature of said wound or its immediate surrounding, said temperature sensor (800) being connected to said processor unit (700) for providing further input thereto as basis for said output of an alarm signal.

The invention claimed is:

1. A biosensor for detecting a biomarker in a bodily fluid, secretion or exudation, comprising:
a first electrode, wherein said first electrode is electrically conductive and comprises a first exposed electrically conductive outer surface extending longitudinally along said first electrode;
a second electrode, wherein said second electrode is electrically conductive and comprises a second exposed electrically conductive outer surface extending longitudinally along the second electrode;
a first insulating partial surface provided between said first electrode and said second electrode having a first side adhered to a first portion of less than all of said first exposed electrically conductive outer surface;
a second insulating partial surface provided between said first electrode and said second electrode having a first side adhered to a second portion of less than all of said second exposed electrically conductive outer surface;
a mechanical electrode stabilizer formed from a non-conductive material or a semi-conductive material and positioned in a gap between said first insulating partial surface and said second insulating partial surface, wherein said mechanical electrode stabilizer is configured to keep the first electrode longitudinally parallel with the second electrode, wherein said mechanical electrode stabilizer is adhered to a second side of said first insulating partial surface opposite said first side of the first insulating partial surface, and is adhered to a second side of said second insulating partial surface opposite said first side of the second insulating partial surface so as to maintain the first electrode and the second electrode in a substantially parallel longitudinal orientation, wherein the mechanical electrode stabilizer forms an integral part of a wound dressing substrate;
an electrode coating, wherein said electrode coating comprises a natural or synthetic substrate of said biomarker and an electrical booster, said electrical booster configured to decrease the impedance between said first electrode and said second electrode when mechanically released from an immobilized form in said electrode coating upon induced chemical and related mechanical degradation thereof by said biomarker;
at least one of a remaining portion of the first exposed electrically conductive outer surface or a remaining portion of the second exposed electrically conductive surface being fully covered by said electrode coating;
said biomarker being an enzyme configured to catalyze a chemical reaction in which a singularity or plurality of constituents of said electrode coating are chemically altered by the breaking of covalent chemical bond when in contact with said biomarker; and
said biosensor configured to exist in at least one state of a group of states comprising a high impedance state, in which said electrode coating is chemically unaltered by said biomarker, and a low impedance state, in which said electrode coating is chemically altered by said biomarker.

2. The biosensor according to claim 1, wherein said bodily fluid, secretion or exudation is a wound exudate or wound drainage produced by a body in response to tissue damage.

3. The biosensor according to claim 2, wherein the wound dressing comprises a layered substrate in which the mechanical electrode stabilizer is embedded between an inner absorbent layer and an outer protective layer.

4. The biosensor according to claim 1, wherein said enzyme is selected from the group of enzymes consisting of Gelatinase and PhosphoLipase A2 (PLA2).

5. The biosensor according to claim 1, wherein said enzyme is Matrix MetalloProteinase-2 (MMP2) and said natural or synthetic substrate being selected from the group of substrates consisting of Collagen I, III, IV, V, VII and X, gelatin, fibronectin, laminin, aggrecan, and elastin, or mixtures thereof.

6. The biosensor according to claim 1, wherein said enzyme is PhosphoLipase A2 (PLA2) and said natural or synthetic substrate is a phospholipid with a glycerol backbone or mixtures thereof.

7. The biosensor according to claim 1, further comprising an electrical conductor selected from the group of conductors consisting of metals, elemental carbon, and electrically conducting organic polymers, wherein the electrical conductor is configured to enable derivation, in full or in part, of electrical conductivity of said first electrode or said second electrode from the presence of the electrical conductor.

8. The biosensor according to claim 1, wherein said mechanical electrode stabilizer consists of cellulose, chemically modified cellulose, an organic polymer, glass fiber, silicon, a thermoplastic, or mixtures thereof.

9. A diagnostic wound dressing system, comprising:
the biosensor according to claim 1;
a wound dressing adapted to protect a wound;
an impedance reader unit electrically connected to said first electrode and said second electrode and configured to measure an impedance or a resistance between said first electrode and said second electrode; and
a processor unit electrically connected to said impedance reader unit and configured to compare impedance data or resistance data with a singularity or plurality of pre-set limit values to output an alarm signal if said pre-set limit values are met or exceeded.

10. The diagnostic wound dressing system according to claim 9, further comprising a temperature sensor electrically connected to said processor unit, wherein the temperature sensor is configured to measure a temperature of said wound or an immediate surrounding of said wound and provide temperature data to said processor unit, wherein said processor unit is further configured to output the alarm signal if a pre-set temperature value is met or exceeded.

* * * * *